(12) United States Patent
Chen

(10) Patent No.: US 11,093,083 B2
(45) Date of Patent: Aug. 17, 2021

(54) METHOD FOR PREVENTING AN EDGE FROM BEING UNINTENTIONALLY TOUCHED, TOUCH CONTROL APPARATUS AND STORAGE MEDIUM

(71) Applicant: Shenzhen Weitongbo Technology Co., Ltd., Guangdong (CN)

(72) Inventor: Xianpeng Chen, Shenzhen (CN)

(73) Assignee: Shenzhen Weitongbo Technology Co., LTD., Shenzhen (CN)

( * ) Notice: Subject to any disclaimer, the term of this patent is extended or adjusted under 35 U.S.C. 154(b) by 0 days.

(21) Appl. No.: 16/416,135

(22) Filed: May 17, 2019

(65) Prior Publication Data
US 2019/0272077 A1 Sep. 5, 2019

Related U.S. Application Data

(63) Continuation of application No. PCT/CN2017/117805, filed on Dec. 21, 2017.

(51) Int. Cl.
*G06F 3/041* (2006.01)
*G06F 3/044* (2006.01)
*G06F 3/0488* (2013.01)

(52) U.S. Cl.
CPC .......... *G06F 3/04186* (2019.05); *G06F 3/044* (2013.01); *G06F 3/0418* (2013.01); *G06F 3/0488* (2013.01)

(58) Field of Classification Search
CPC .... G06F 3/04186; G06F 3/0418; G06F 3/044; G06F 3/0488
(Continued)

(56) References Cited

U.S. PATENT DOCUMENTS 9,081,450 B1    7/2015  Mohindra
9,367,238 B2    6/2016  Tanada
(Continued)

FOREIGN PATENT DOCUMENTS

CN    101482785 A    7/2009
CN    102789332 A    11/2012
(Continued)

OTHER PUBLICATIONS

European Extended Search Report dated Sep. 30, 2019, Patent Application No. 17931080.0, filed Dec. 21, 2017, 9 pages.
(Continued)

*Primary Examiner* — Amare Mengistu
*Assistant Examiner* — Gloryvid Figueroa-Gibson
(74) *Attorney, Agent, or Firm* — Davis Wright Tremaine LLP

(57) ABSTRACT

The present disclosure relates to touch technology, and provides a method for preventing an edge from being unintentionally touched, a touch control apparatus and a storage medium. The method comprises: acquiring touch data of a touch screen in real time; judging whether there is any edge touch operation according to the touch data; calculating a coordinate point movement track of the edge touch operation according to the touch data if there is an edge touch operation; judging whether the edge touch operation is an edge mis-operation according to the touch data and the coordinate point movement track; and suppressing the edge mis-operation if the edge touch operation is an edge mis-operation. With embodiments of the present disclosure, accuracy of edge mis-operation recognition is improved while ensuring a normal response of an edge region of a screen.

16 Claims, 3 Drawing Sheets

(58) Field of Classification Search
USPC ........................................................ 345/174
See application file for complete search history.

(56) References Cited

U.S. PATENT DOCUMENTS

| | | | | |
|---|---|---|---|---|
| 2009/0174679 | A1* | 7/2009 | Westerman | ........... G06F 3/0418 345/173 |
| 2012/0293454 | A1 | 11/2012 | Tsai et al. | |
| 2017/0123590 | A1* | 5/2017 | Han | ...................... G06F 3/0418 |

FOREIGN PATENT DOCUMENTS

| | | |
|---|---|---|
| CN | 104007932 A | 8/2014 |
| CN | 104423656 A | 3/2015 |
| CN | 104615302 A | 5/2015 |
| CN | 105117020 A | 12/2015 |
| CN | 105117132 A | 12/2015 |
| CN | 105739875 A | 7/2016 |
| CN | 106648233 A | 5/2017 |
| CN | 106855783 A | 6/2017 |
| EP | 2077490 A2 | 7/2009 |
| EP | 2980679 A1 | 2/2016 |
| EP | 3128409 A1 | 2/2017 |
| KR | 101392673 B1 | 5/2014 |

OTHER PUBLICATIONS

International Search Report mailed in International Patent Application No. PCT/CN2017/117805, filed on Dec. 21, 2017, 5 pages.
Chinese First Office Action dated Sep. 25, 2020, Patent Application No. 201780002301.X, 16 pages.
European Communication pursuant to Article 94(3) EPC dated Jan. 29, 2021, Application No. 17931080.0 , 7 pages.
Chinese Office Action dated Apr. 21, 2021, Patent Application No. 201780002301X, 11 pages.

* cited by examiner

METHOD FOR PREVENTING AN EDGE FROM BEING UNINTENTIONALLY TOUCHED, TOUCH CONTROL APPARATUS AND STORAGE MEDIUM

CROSS REFERENCE TO RELATED APPLICATIONS

The present application is a continuation of international application No. PCT/CN2017/117805, filed on Dec. 21, 2017, which is hereby incorporated by reference in its entirety.

TECHNICAL FIELD

The present disclosure relates to touch technology, and more particularly, to a method for preventing an edge from being unintentionally touched, a touch control apparatus and a storage medium.

BACKGROUND

With the full-screen development trend of mobile phones, a screen-to-body ratio is getting higher and higher, which significantly improves users' viewing experience. However, as the frame is getting narrower and narrower, a problem of unintentionally touched edge caused by the narrow frame on which the mobile phone is held by hand, becomes increasingly prominent. Especially in case of one handed operation, the problem of unintentional touch seriously affects the users' operation experience, so design requirements for preventing an edge from being unintentionally touched are getting higher and higher.

SUMMARY

An objective of some embodiments of the present disclosure is to provide a method for preventing an edge from being unintentionally touched, a touch control apparatus and a storage medium, which improve accuracy of identifying edge mis-operation while ensuring a normal response of an edge region of a screen.

An embodiment of the present disclosure provides a method for preventing an edge from being unintentionally touched, which comprises: acquiring touch data of a touch screen in real time; judging whether there is any edge touch operation according to the touch data; calculating a coordinate point movement track of the edge touch operation according to the touch data if there is an edge touch operation; judging whether the edge touch operation is an edge mis-operation according to the touch data and the coordinate point movement track; and suppressing the edge mis-operation if the edge touch operation is an edge mis-operation.

An embodiment of the present disclosure further provides a touch control apparatus which comprises at least one processor, and a memory communicatively connected with the at least one processor. The memory stores instructions executable by the at least one processor, the instructions are executed by the at least one processor, so that the at least one processor can execute the above-described method for preventing an edge from being unintentionally touched.

An embodiment of the present disclosure further provides a storage medium which stores a computer program. The computer program, when executed by a processor, implements the above-described method for preventing an edge from being unintentionally touched.

As compared with the existing technology, in the embodiments of the present disclosure, when the edge touch operation is detected, cases of a finger normal operation and a palm/finger unintentional touch are preliminarily distinguished according to the touch data of the edge touch operation. On this basis, a movement situation of the edge touch operation that preliminarily conforms to the case of a palm/finger unintentional touch is further detected according to the coordinate point movement track, so as to judge whether the edge touch operation is an edge mis-operation. Therefore, in the embodiments of the present disclosure, accuracy of identifying edge mis-operation can be improved, without affecting normal use of an edge region of a screen.

Furthermore, the judging whether the edge touch operation is an edge mis-operation according to the touch data and the coordinate point movement track, specifically includes: judging whether a suppression region is detected within a first preset period according to the touch data; where, the suppression region is used to represent a critical judgment condition of an edge unintentional touch, judging whether the coordinate point movement track satisfies a preset movement condition if a suppression region is detected within the first preset period; and determining the edge touch operation as an edge mis-operation if the preset movement condition is not satisfied. By judging whether the edge touch operation detects a suppression region to judge whether an edge mis-operation is preliminarily detected, and by detecting whether the preliminarily detected edge mis-operation satisfies the preset movement condition, a normal operation mode of the user is removed from the edge touch operation that is preliminarily determined as the edge mis-operation, so that the detection of the edge mis-operation is accurate and reliable.

Furthermore, the judging whether a suppression region is detected within a first preset period according to the touch data, includes: judging whether a touched region of the edge touch operation is a suppression region when the edge touch operation is detected; if the touched region is a suppression region, determining the touched region as a suppression region, and proceeding to judge whether the coordinate point movement track satisfies the preset movement condition; if the touched region is not a suppression region, continuously judging whether the touched region of the edge touch operation is a suppression region before the first preset period is reached; if the touched region is detected as a suppression region before the first preset period is reached, determining the touched region as a suppression region, and proceeding to judge whether the coordinate point movement track satisfies the preset movement condition. In an embodiment of the present disclosure, when the edge touch operation is detected, it is judged whether the touched region of the edge touch operation is a suppression region, so that most edge mis-operations can be preliminarily detected quickly.

Furthermore, the judging whether the touched region of the edge touch operation is a suppression region, includes: judging whether the numbers of touch nodes of N edge detection channels of the touched region are all greater than a first preset value, and whether the numbers of touch nodes of the N edge detection channels sequentially decrease in a direction from an edge of the touch screen to a center of the touch screen; if the numbers of touch nodes of the N edge detection channels of the touched region are all greater than the first preset value and the numbers of touch nodes of the N edge detection channels sequentially decrease in the direction from the edge of the touch screen to the center of the touch screen, determining the touched region as a suppression region. Here, N is a natural number greater than or equal to 2. In an embodiment of the present disclosure, an edge mis-operation by a palm can be accurately identified.

Furthermore, before the judging whether the numbers of touch nodes of N edge detection channels of the touched region are all greater than a first preset value, and whether the numbers of touch nodes of the N edge detection channels sequentially decrease in a direction from an edge of the touch screen to a center of the touch screen, the method further comprises: judging whether the touched region is a single-channel touched region or a multi-channel touched region; if the touched region is a multi-channel touched region, proceeding to judge whether the numbers of touch nodes of the N edge detection channels of the touched region are all greater than the first preset value, and whether the numbers of touch nodes of the N edge detection channels sequentially decrease in the direction from the edge of the touch screen to the center of the touch screen; if the touched region is a single-channel touched region, judging whether the number of touch nodes included in the single-channel touched region is greater than a second preset value; if it is greater than the second preset value, determining the single-channel touched region as a suppression region. In an embodiment of the present disclosure, an edge mis-operation by a palm when the apparatus is hand-held may further be accurately identified.

Furthermore, the method further comprises: if no suppression region is detected within the first preset period, recognizing an operation mode of the edge touch operation according to the coordinate point movement track, and outputting the edge touch operation according to the recognized operation mode. In an embodiment of the present disclosure, a normal operation mode in the edge touch operation may be further detected and output in time, so as to ensure a real-time response to the edge touch operation.

Furthermore, the recognizing an operation mode of the edge touch operation according to the coordinate point movement track includes: judging whether it is detected that a movement distance of the edge touch operation is greater than a preset distance within the first preset period according to the coordinate point movement track; if it is greater than the preset distance, determining the operation mode of the edge touch operation as a swipe. In an embodiment of the present disclosure, a swipe operation in the edge touch operation may be quickly detected.

Furthermore, the method further comprises: if it is not detected that the movement distance of the edge touch operation is greater than the preset distance within the first preset period, determining the operation mode of the edge touch operation as a click or a long press. In an embodiment of the present disclosure, a click or long press operation in the edge touch operation may further be accurately detected.

The method further comprises: if it is determined that the touched region of the edge touch operation is not a suppression region when the edge touch operation is detected, detecting whether the edge touch operation leaves the touch screen within the first preset period; if it is detected that the edge touch operation leaves the touch screen within the first preset period, determining the operation mode of the edge touch operation as a quick click. In an embodiment of the present disclosure, a quick click operation in the edge touch operation may further be accurately detected.

Furthermore, the judging whether the coordinate point movement track satisfies a preset movement condition, specifically includes: judging whether the edge touch operation moves from the edge of the touch screen to the center of the touch screen, and determining that the coordinate point movement track satisfies the preset movement condition if the edge touch operation moves from the edge of the touch screen to the center of the touch screen; or, judging whether the edge touch operation is a swipe operation, and determining that the coordinate point movement track satisfies the preset movement condition if the edge touch operation is a swipe operation. In an embodiment of the present disclosure, the operation mode of leaving the edge of the touch screen and the swipe operation at the edge may be detected from the edge touch operation that is preliminarily determined as the edge mis-operation.

Furthermore, the touched region of the edge touch operation is obtained in a following manner: acquiring an initial region of the edge touch operation when the edge touch operation is detected, in which difference values of touch nodes within the initial region are all greater than a preset node threshold; if the initial region is a single-channel region, searching a touch node from a center of the single-channel region to both ends thereof; if any touch node is found after skipping the preset number of nodes, merging the found touch node into the single-channel region to obtain an enhanced single-channel region; and taking the enhanced single-channel region as the touched region of the edge touch operation. In an embodiment of the present disclosure, an edge mis-operation caused by multi-finger holding the frame may be detected by merging a plurality of single-channel regions.

The touched region of the edge touch operation is obtained in a following manner: if the edge touch operation is located in a corner position of the touch screen when the edge touch operation is detected, supplementing the number of touch nodes of the touched region of the edge touch operation according to a preset compensation mode. In an embodiment of the present disclosure, the number of touch nodes of the edge touch operation in the corner position is compensated, which is favorable for recognizing an edge mis-operation caused by failure to detect a suppression region due to screen body data missing and too few nodes when a palm touches a corner.

Furthermore, the touched region of the touch operation on the touch screen is obtained in a following manner: extracting a first region from the touch data of the touch operation when the touch operation on the touch screen is detected, in which difference values of touch nodes within the first region is all greater than a first node threshold; performing search within a detection channel adjacent to the first region and close to the edge of the touch screen to determine whether there is any touch node whose difference value is greater than a second node threshold; if there is, merging the touch node, whose difference value is greater than the second node threshold, into the first region to obtain an enhanced region, and taking the enhanced region as the touched region of the touch operation on the touch screen. Herein, the second node threshold is smaller than the first node threshold. In an embodiment of the present disclosure, a touch node with a relatively small difference value is considered, so that it is favorable for accurately detecting an edge mis-operation.

The method for preventing an edge from being unintentionally touched, further comprises: judging whether a touch operation occurs in a central region of the touch screen within a third preset period before the edge touch operation is detected; if no touch operation occurs in the central region of the touch screen, proceeding to calculate the coordinate point movement track of the edge touch operation according to the touch data; and if a touch operation occurs in the central region of the touch screen, suppressing the edge touch operation. When the user's finger touches the central region of the touch screen, the edge touch operation detected within relatively short time (i.e., the third preset period) is usually an edge mis-operation; and therefore, an embodiment of the present disclosure is favorable for quickly suppressing the edge mis-operation as described above.

BRIEF DESCRIPTION OF THE DRAWINGS

One or more embodiments are exemplarily illustrated with reference to the diagrams in the accompanying drawings, these exemplary illustration do not constitute a limitation to the embodiments, elements having the same reference sign are denoted as similar elements; and unless otherwise specifically declared, the diagrams in the accompanying drawings do not constitute a limitation of proportion.

DETAILED DESCRIPTION

Figures 1, 2:
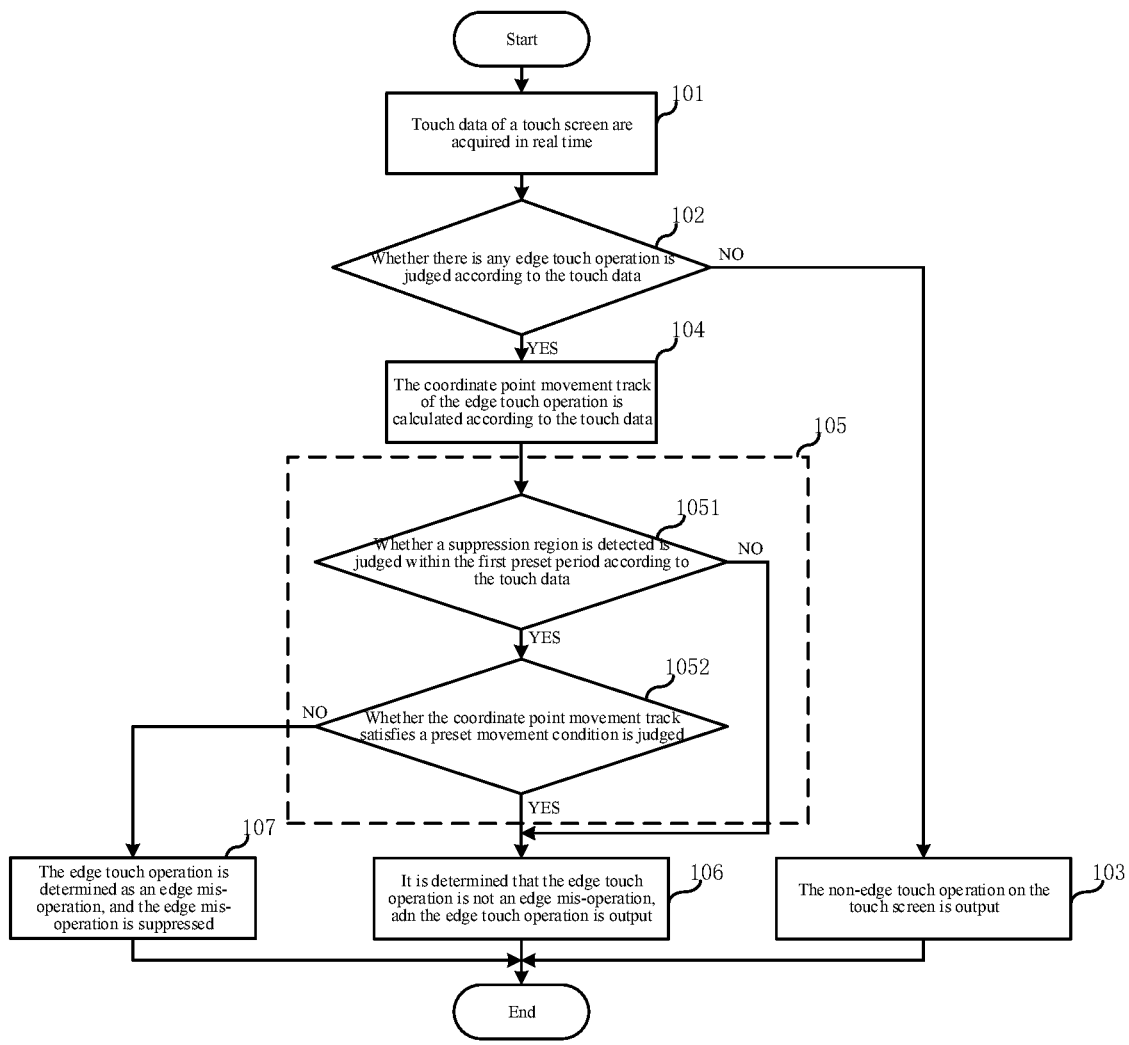
FIG. 1 is a flow chart of a method for preventing an edge from being unintentionally touched according to a first embodiment of the present disclosure.
FIG. 2 is a schematic diagram of a touched region of the method for preventing an edge from being unintentionally touched according to the first embodiment of the present disclosure.

In order to make objectives, technical solutions and advantages of the embodiments of the present disclosure more apparent, some embodiments of the present disclosure will be further explained in detail below in conjunction with the drawings and the embodiments. It should be understood that the specific embodiments descried here are merely used for explaining the present disclosure, and not intended to limit the present disclosure.

The existing processing modes of preventing an edge from being unintentionally touched mainly include two following types. One is that a screen is divided into several regions, in which a long and narrow region at an edge is deemed as an unintentional touch region, and any detected click on the unintentional touch region is directly filtered without reporting its coordinates. The other is that whether it is a finger or a palm that touches the edge is determined according to data characteristics (for example, a length, a width, an area, etc. of a touch region) of respective sampled nodes, and an unintentional touch of a palm is determined if the touch region is at the edge and is relatively large, and then the unintentional touch of a palm is shielded without reporting its coordinates, so as to avoid an unexpected response of the screen.

The inventor(s) find that the existing technology at least has the problem that: although the above-described modes can detect and handle most situations of mis-operation at an edge, there are still many limitations. For example, a response to a click on the unintentional touch region cannot be provided and a line cannot be drawn in the unintentional touch region (that is, an effective utilization area of the screen is reduced); and judgment is inaccurate when operating the edge of the mobile phone with one hand in different palms or different postures, which causes an error response. Therefore, the existing modes for preventing an edge from being unintentionally touched no longer satisfy an unintentional touch prevention demand of the narrow-frame mobile phone.

A first embodiment of the present disclosure relates to a method for preventing an edge from being unintentionally touched, which is applied to an electronic apparatus having a touch display screen, and is particularly applicable to a smartphone with a narrow frame. The method according to this embodiment comprises: acquiring touch data of a touch screen in real time, judging whether there is any edge touch operation according to the touch data, calculating a coordinate point movement track of the edge touch operation according to the touch data acquired in real time if there is an edge touch operation, judging whether the edge touch operation is an edge mis-operation according to the touch data and the coordinate point movement track, and suppressing the edge mis-operation if the edge touch operation is determined as an edge mis-operation.

As compared with the existing technology, in this embodiment, when the edge touch operation is detected, cases of a finger normal operation and a palm/finger unintentional touch are preliminarily distinguished according to the touch data of the edge touch operation. On this basis, an operation mode of the edge touch operation that preliminarily conforms to the case of a palm/finger unintentional touch is further detected according to the coordinate point movement track, so as to judge whether the edge touch operation is an edge mis-operation. Therefore, in this embodiment, accuracy of identifying edge mis-operation can be improved, without affecting normal use of an edge region of a screen.

The method for preventing an edge from being unintentionally touched will be described in detail below through specific embodiments.

With reference to FIG. 1, the method for preventing an edge from being unintentionally touched according to this embodiment comprises step 101 to step 107.

Step 101: touch data of a touch screen are acquired in real time.

Specifically, the touch screen may be, for example, a capacitive touch screen. Generally, the capacitive touch screen includes capacitive sensing units arranged in an array, and one frame of touch data on the touch screen may be obtained by scanning the array-type capacitive sensing units. In practical application, the touch screen may further be an optical touch screen, an ultrasonic touch screen, and the like. A type of the touch screen is not specifically limited in this embodiment, and illustration is provided below with the capacitive touch screen as an example.

With reference to FIG. 2, for convenience of subsequent calculation, in the touch data of this embodiment, a rectangular block is used for indicating a detection region of each capacitive sensing unit. When a touch subject such as a finger or a palm touches the touch screen, a capacitance of the capacitive sensing unit changes (that is, has a difference value), and one frame of touch data is obtained just by acquiring difference values of each capacitive sensing unit of the touch screen. Numbers in each rectangular block of FIG. 2 indicate magnitudes of the difference values which indicate magnitudes of changes in capacitances caused by a touch, and a plurality of rectangular blocks having the difference values are arranged together to form a touched region of the current touch operation. For example, rectangular blocks with gray background in FIG. 2 are arranged to form a touched region. It should be noted that touch nodes within the touched region are continuous, that is, any discrete touch node is not contained (it is noted that the discrete touch node is a node that is not connected with any other node). A small rectangle within each touched region is a touch node, the total number of nodes within the touched region is the number of touch nodes. In a practical product, one touch node may correspond to one sensing node or detection point. Each column/each row also respectively has the number of touch nodes of its own; and correspondingly, each row/column may be regarded as one detection channel, and one detection channel may be one driving line/one sensing line of a touch sensor.

It is worth mentioning that, in some examples, the number of touch nodes within a touched region of a touch operation may further be compensated, so that it is favorable for more accurate recognition of an edge mis-operation. Specifically, in one example, a touched region of a touch operation on the touch screen may be obtained in a following manner. The touch operation on the touch screen may be an edge touch operation or a non-edge touch operation when the touch operation on the touch screen is detected. A first region is extracted from the touch data of the touch operation, and difference values of touch nodes within the first region are all greater than a first node threshold. Here, the first node threshold is, for example, 9. Search is performed within a detection channel adjacent to the first region and close to the edge of the touch screen to determine whether there is any touch node whose difference value is greater than a second node threshold. Here, the second node threshold is smaller than the first node threshold, and the second node threshold is, for example, 3. If there is any touch node whose difference value is greater than the second node threshold, the touch node whose difference value is greater than the second node threshold is merged into the first region to obtain an enhanced region, and the enhanced region is taken as the touched region of the touch operation on the touch screen. It is worth mentioning that, before the first region is extracted from the touch data of the touch operation, it may further be preliminarily judged whether a touch position of the touch operation is close to the edge of the touch screen. If the touch position of the touch operation is close to the edge of the touch screen, for example, a distance between the touch position of the touch operation and the edge of the touch screen is smaller than a width value of a thumb, the obtained enhanced region is taken as the touched region according to the foregoing merging manner, so that a small rectangle with a relatively small difference value at the edge position of the touch screen is also merged into the touched region, which increases the number of touch nodes within the touched region. In this way, a touch node with a smaller difference value at the edge of the touch screen is also taken into account, so that the edge touch operation may be detected by using touch data with higher precision. It should be noted that, the touched region may be obtained by using the above-described manner, in a case that it is judged whether the touch operation is an edge touch operation (with reference to step 102 below), or it is judged whether the touched region of the edge touch operation is a suppression region (for detection of a suppression region, description below may be referred to), and the like, so that the edge touch operation may be detected more accurately, or the suppression region may be detected more accurately, while in other cases, the touched region of the touch operation may be still obtained in an existing manner, in which difference values of touch nodes within the touched region are all greater than the first node threshold.

Step 102: whether there is any edge touch operation is judged according to the touch data. If there is an edge touch operation, step 104 is executed. And if there is no edge touch operation, step 103 is executed.

Specifically, when a touch operation on the touch screen is detected, it is judged whether a touched region of the touch operation on the touch screen intersects with a boundary of the touch screen. If it intersects therewith, the touch operation on the touch screen is determined as an edge touch operation, and at this time, step 104 continues to be executed. And if it does not intersect therewith, the touch operation on the touch screen is determined as a non-edge touch operation, and at this time, step 103 continues to be executed. In practical application, as long as the touched region of the touch operation on the touch screen does not include any touch node within the detection channel at the edge of the touch screen, it may be judged that the touch operation is not an edge touch operation. When a touch operation on the touch screen is detected, for example, when the touched region of the touch operation includes any touch node within the detection channel at the edge of the touch screen, the touch operation may be determined as an edge touch operation.

It should be noted that, when a plurality of touch operations are detected simultaneously, in order to distinguish between touches applied by different fingers, each touch operation may be detected by using a single finger tracking technology, and an identifier (ID) is assigned to each touch operation, so as to distinguish touch operations of different fingers through the identifiers. The single finger tracking technology is well known to those skilled in the art, which will not go into details here.

Step 103: the non-edge touch operation on the touch screen is output.

Specifically, when a touch operation on the touch screen is detected, touch coordinates on the touch screen are acquired in real time, and when it is judged that the current touch operation is not an edge touch operation, the obtained touch coordinates of the current touch operation are reported to a system in real time, so that the touch screen make response to the user's current touch operation in real time.

Step 104: the coordinate point movement track of the edge touch operation is calculated according to the touch data.

Specifically, a centroid of the touched region in each frame of touch data of the edge touch operation may be calculated, and the coordinate point movement track of the edge touch operation is calculated according to centroids of respective frames of touch data. A calculation method of the coordinate point movement track is well known to those skilled in the art, which will not go into details here.

Step 105: whether the edge touch operation is an edge mis-operation is judged according to the touch data and the coordinate point movement track. If it is an edge mis-operation, step 107 is executed; and if it is not an edge mis-operation, step 106 is executed.

In this embodiment, in order to overcome influence of different fingers, different palms, and different postures on a critical judgment condition of the edge mis-operation, on the one hand, it is judged whether the edge touch operation reaches the critical judgment condition according to the touch data within a period. For example, it is judged whether the touched region of the edge touch operation is a suppression region within a first preset period, that is, multiple detections are performed on whether the edge touch operation reaches the critical judgment condition of the edge mis-operation within a period, which is equivalent to appropriately extending time for detecting whether the edge touch operation reaches the critical judgment condition of the edge mis-operation, so that it is favorable for eliminating a misjudgment problem that may be brought by a same critical judgment condition under different postures. For example, when a palm moves from the frame to the center of the touch screen, in a case where only a small portion of the palm is in contact with the touch screen, touch data of the palm is relatively close to touch data of a finger at this time, so it is difficult to reject an edge mis-operation caused by a touch of a small portion of the palm only through the critical judgment condition. However, when the touch operation of the palm is continuously detected within a period, in a case where more portion of the palm touches on the touch screen, the palm touch may be preliminarily distinguished from the finger touch more accurately through the critical judgment condition at this time. On the other hand, detection of operation mode may be further performed on the edge touch operation that is preliminarily determined as an edge mis-operation. If it is detected that the edge touch operation that is preliminarily determined as an edge mis-operation matches a preset operation mode (i.e., a normal operation mode of the user), it is determined that the edge touch operation is not an edge mis-operation. And If it is detected that the edge touch operation that is preliminarily determined as an edge mis-operation does not match the preset operation mode, the edge touch operation is determined as an edge mis-operation. In this case, it is more favorable for accurately responding to the normal operation mode of the user, and avoiding suppressing a normal operation in the edge touch operation that satisfies the critical judgment condition.

Specifically, step 105 includes sub-step 1051 and sub-step 1052.

Sub-step 1051: whether a suppression region is detected is judged within the first preset period according to the touch data. If a suppression region is detected within the first preset period, sub-step 1052 is further executed. And if a suppression region is not detected within the first preset period, step 106 is executed.

Sub-step 1052: whether the coordinate point movement track satisfies a preset movement condition is judged. If it is determined that the coordinate point movement track satisfies the preset movement condition, step 106 is executed. And if it is determined that the coordinate point movement track does not satisfy the preset movement condition, step 107 is executed.

Herein, the suppression region is used for representing a critical judgment condition of an edge unintentional touch, so as to be used for distinguishing between a normal operation and a mis-operation of a touch subject. The touch subject includes, for example, a finger and a palm. The normal operation of the touch subject includes, for example: a finger swipe, a quick click, a click or a long press, and so on; and the mis-operation of the touch subject includes, for example: a palm unintentional touch, an unintentional touch caused by a finger holding the frame of the mobile phone, and so on. Therefore, the suppression region may be set according to situations in which mis-operations are caused by different touch subjects. For example, with respect to a palm unintentional touch, a preset shape and area that is used for representation of a suppression region may be set according to a shape and an area of the palm, so as to distinguish between the palm unintentional touch and the finger touch. With respect to the unintentional touch caused by the finger holding the frame of the mobile phone, a preset number of nodes that is used for representation of a suppression region may be set according to characteristic of the finger holding the frame. The suppression region is not specifically limited in this embodiment. When it is detected that the touch data of the edge touch operation satisfies the preset shape and area or the preset number of nodes within the first preset period, it is determined that a suppression region is detected, otherwise, it is determined that no suppression region is detected, or it is determined that a detection region is detected; and the detection region is a type of the touched region other than a suppression region.

In order to ensure a real-time response of the edge touch operation, the judging whether a suppression region is detected within the first preset period according to the touch data specifically includes: judging whether the touched region of the edge touch operation is a suppression region when the edge touch operation is detected; further executing sub-step 1052 if the touched region of the edge touch operation is a suppression region; and continuously judging whether the touched region of the edge touch operation is a suppression region before the first preset period is reached, if the touched region of the edge touch operation is not a suppression region; and further executing sub-step 1052, if it is detected that the touched region is a suppression region within the first preset period (i.e., before the first preset period is reached). In most cases, when the edge touch operation is detected, an unintentional touch of a finger or a palm may be preliminarily detected. That is, when the touch subject starts to touch on the touch screen, the touch data of its touch operation satisfies the critical judgment condition. Therefore, the edge mis-operation may be preliminarily determined quickly. It should be noted that, the first preset period may be time required for scanning to obtain multi-frame touch data, for example, 20-frame touch data. The first preset period is not specifically limited in this embodiment, which may be set by those skilled in the art according to experiences based on consideration of a response speed of the touch operation.

Figures 3, 4, 5:
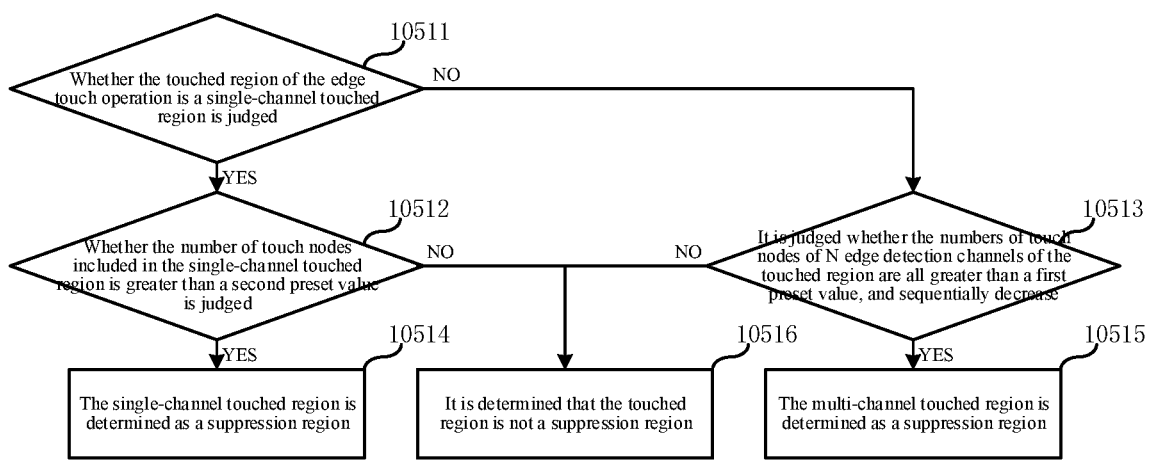
FIG. 3 is a schematic diagram of a single-channel touched region of the method for preventing an edge from being unintentionally touched according to the first embodiment of the present disclosure.
FIG. 4 is a schematic diagram of a multi-channel touched region of the method for preventing an edge from being unintentionally touched according to the first embodiment of the present disclosure.
FIG. 5 is a flow chart of a sub-step of judging whether a touched region of an edge touch operation is a suppression region in step 105 according to the first embodiment of the present disclosure.

In one example, whether the touched region of the edge touch operation is a suppression region is judged in a following mode. Herein, the touched region of the edge mis-operation caused by the palm or the finger, etc. is classified into a single-channel touched region and a multi-channel touched region. A touched region including two or more detection channels is a multi-channel touched region, and a touched region including only one detection channel is a single-channel touched region. For example, when the palm slightly touches the edge of the touch screen of the mobile phone, or when a user holds the mobile phone, or when the finger clicks at a position that is very close to the edge, a case where only one detection channel at the edge of the touch screen (i.e., the outermost touch screen) has touch data is likely to occur, and at this time, a plurality of edge touch operations having a single-channel touched region may be detected. FIG. 3 shows a schematic diagram of the single-channel touched region. The edge mis-operation caused by the palm generally includes a multi-channel touched region, and the number of touch nodes of the multi-channel touched region shows a decreasing trend as a position of the detection channel moves from the edge of the touch screen to the center of the touch screen. FIG. 4 shows a schematic diagram of the multi-channel touched region. In this embodiment, based on characteristics of the above-described finger and palm unintentional touches, a preliminary judgment manner of the edge mis-operation, that is, how to judge whether the touched region of the edge touch operation is a suppression region, is proposed below. In practical application, the multi-channel touched region may be further classified, and the suppression region is not specifically limited in this embodiment.

With reference to FIG. 5, specifically, sub-step 1051 of judging whether the touched region of the edge touch operation is a suppression region specifically includes sub-steps below: sub-step 10511 to sub-step 10516. The judging whether the touched region of the edge touch operation is a suppression region may be periodically performed within the first preset period, for example, judging whether the touched region is a suppression region is performed once every time that two frames of touch data are obtained by scanning. A specific execution manner of judging whether the touched region of the edge touch operation is a suppression region is not limited in this embodiment.

Sub-step 10511: whether the touched region of the edge touch operation is a single-channel touched region is judged. If it is a single-channel touched region, sub-step 10512 is executed; and if it is not a single-channel touched region, that is, the touched region of the edge touch operation is a multi-channel touched region, sub-step 10513 is executed.

Sub-step 10512: whether the number of touch nodes included in the single-channel touched region is greater than a second preset value is judged. If it is greater than the second preset value, sub-step 10514 is executed; and if it is less than or equal to the second preset value, sub-step 10516 is executed.

Sub-step 10513: it is judged whether the numbers of touch nodes of N edge detection channels of the touched region of the edge touch operation are all greater than a first preset value, and whether the numbers of touch nodes of the N edge detection channels sequentially decrease in a direction from the edge of the touch screen to the center of the touch screen. If the numbers of touch nodes of the N edge detection channels are all greater than the first preset value and sequentially decrease in the direction from the edge of the touch screen to the center of the touch screen, sub-step 10515 is executed; and if the numbers of touch nodes of the N edge detection channels are all less than or equal to the first preset value, and the numbers of touch nodes of the N edge detection channels are the same or gradually increase in the direction from the edge of the touch screen to the center of the touch screen, sub-step 10516 is executed.

Herein, the N edge detection channels are N detection channels that are included in the touched region and are close to the edge of the touch screen. N is, for example, 2. The value of N is not specifically limited in this embodiment. If the numbers of touch nodes of 2 edge detection channels of the touched region are both greater than the first preset value, and the numbers of touch nodes of the 2 edge detection channels sequentially decrease in the direction from the edge of the touch screen to the center of the touch screen, it is determined that the multi-channel touched region is a suppression region. If the numbers of touch nodes of the 2 edge detection channels of the touched region are both less than or equal to the first preset value, and the numbers of touch nodes of the 2 edge detection channels are the same or gradually increase in the direction from the edge of the touch screen to the center of the touch screen, sub-step 10516 is executed.

Sub-step 10514: the single-channel touched region is determined as a suppression region.

Sub-step 10515: the multi-channel touched region is determined as a suppression region.

Sub-step 10516: it is determined that the touched region is not a suppression region.

Herein, when the touched region is determined as a suppression region, sub-step 1052 continues to be executed. When it is determined that the touched region is not a suppression region and the first preset period is not reached, sub-step 10511 to sub-step 10513 are executed repeatedly until the first preset period is reached, or until it is detected that the touched region is a suppression region.

It is worth mentioning that, in this embodiment, the single-channel touched region may be obtained in a following manner: acquiring an initial region of the edge touch operation when the edge touch operation is detected. Herein, difference values of touch nodes within the initial region are all greater than a preset node threshold. The preset node threshold is, for example, equal to the second node threshold. The preset node threshold is not specifically limited in this embodiment. If the initial region of the edge touch operation is a single-channel region, a touch node is searched from a center of the single-channel region to both ends thereof. If any touch node is found after skipping the preset number of nodes, for example, a touch node is found after skipping 3 touch nodes, the found touch node is merged into the single-channel region to obtain an enhanced single-channel region, and the enhanced single-channel region is taken as the single-channel touched region of the edge touch operation. Herein, the preset number may be determined according to the number of nodes that do not have a difference value on the touch screen due to presence of gaps between fingers when a plurality of fingers are holding the frame of the mobile phone, and the preset number is not specifically limited in this embodiment. The enhanced single-channel region is, for example, the single-channel touched region generated by a plurality of fingers when holding the frame of the mobile phone, so a case of a single finger holding the frame of the mobile phone may be distinguished from a case of a plurality of fingers holding the same when the second preset value is determined based on the number of touch nodes of the enhanced single-channel region. Specifically, the second preset value is, for example, 1.5 times of the number of touch nodes of a single finger touching on the touch screen when holding the frame, so that an edge mis-operation caused by the plurality of fingers simultaneously holding the frame of the mobile phone may be detected. The second preset value is not specifically limited in this embodiment.

The first preset value is determined, for example, according to a situation of a palm touch, for example, with respect to an outermost detection channel (i.e., a detection channel at the edge of the touch screen) and a secondary outer detection channel (i.e., a detection channel adjacent to the detection channel at the edge of the touch screen) of the multi-channel touched region, the first preset value may be greater than the number of touch nodes generated by a touch of a single finger, for example, a thumb. Alternatively, touch node thresholds may be respectively set with respect to the outermost detection channel and the secondary outer detection channel of the multi-channel touched region. The first preset value is not specifically limited in this embodiment. In this embodiment, an edge mis-operation caused by a palm may be screened out through the first preset value.

In practical application, in order to enhance detection of an edge touch operation in a corner position of the touch screen, in one example, it may also be judged whether the edge touch operation is located in a corner position of the touch screen when the edge touch operation is detected. If the edge touch operation is located in the corner position of the touch screen, the number of touch nodes (i.e., the number of small rectangles within the touched region) of the touched region of the edge touch operation is supplemented according to a preset compensation manner. For example, the number of touch nodes of the touched region of the edge touch operation is supplemented according to a symmetric compensation manner. For example, when it is detected that the edge touch operation is located in a corner position of the touch screen, the number of touch nodes of the touched region of the edge touch operation is obtained, and the obtained number of touch nodes is multiplied, for example, doubled, to serve as the number of touch nodes of the touched region of the edge touch operation in the corner position. Thus, it is favorable for recognizing an edge mis-operation caused by failure to detect a suppression region due to screen body data missing or too few nodes when a palm touches a corner. The corner position refers to, for example, four apex positions of the touch screen, and a manner of judging that the edge touch operation is located in the corner position may be, for example, judging whether the touched region of the edge touch operation simultaneously intersects with two adjacent boundaries of the touch screen, which will not go into details here.

When a suppression region is detected according to the touch data within the first preset period, it is judged whether the coordinate point movement track satisfies the preset movement condition. If the preset movement condition is not satisfied, step 107 is executed; and if the preset movement condition is satisfied, step 106 is executed.

The preset movement condition is used for reflecting an operation mode desired by the user in the edge touch operation, and the preset movement condition is not specifically limited in this embodiment. For example, in one example, sub-step 1052 of judging whether the coordinate point movement track satisfies a preset movement condition specifically includes: judging whether the edge touch operation moves from the edge of the touch screen to the center of the touch screen, and determining that the coordinate point movement track of the edge touch operation satisfies the preset movement condition if the edge touch operation moves from the edge of the touch screen to the center of the touch screen. At this time, step 106 is executed. In other words, when it is detected that the edge touch operation, that is preliminarily determined as an edge mis-operation, moves from the edge of the touch screen to the center of the touch screen according to the coordinate point movement track, it may be determined that the edge touch operation is an operation mode desired by the user. Alternatively, sub-step 1052 of judging whether the coordinate point movement track satisfies a preset movement condition specifically includes: judging whether the edge touch operation is a swipe operation, and determining that the coordinate point movement track of the edge touch operation satisfies the preset movement condition if the edge touch operation is a swipe operation. At this time, step 106 is executed. In other words, when it is detected that the edge touch operation, that is preliminarily determined as an edge mis-operation, is a swipe operation according to the coordinate point movement track, it may also be determined that the edge touch operation is an operation mode desired by the user. In one example, the judging whether the edge touch operation is a swipe operation, specifically includes: detecting whether a movement speed of a coordinate point of the edge touch operation is greater than a preset speed threshold within a second preset period, and determining that the edge touch operation as a swipe operation if it is detected that the movement speed of the coordinate point of the edge touch operation is greater than the preset speed threshold within the second preset period. For example, within the second preset period, it is detected that 3 movements occur to the edge touch operation according to the coordinate point movement track, and a movement speed of each movement is greater than the preset speed threshold, then the edge touch operation is determined as a swipe operation. If a movement speed of one movement (or two movements) is less than or equal to the preset speed threshold, the edge touch operation is determined as an edge mis-operation. Herein, the second preset period and the speed threshold may both be set according to experiences.

Judging the operation mode of the touch operation according to the coordinate point movement track is well known to those skilled in the art and will not go into details here.

In practical application, the above-described two modes may be simultaneously used for judging whether the coordinate point movement track of the edge touch operation, that is preliminarily determined as an edge mis-operation, satisfies the preset movement condition. For example, it may be firstly judged whether the edge touch operation moves from the edge of the touch screen to the center of the touch screen, then it continues to be judged whether the edge touch operation is a swipe operation if the edge touch operation does not move from the edge of the touch screen to the center of the touch screen. If it is not detected that the edge touch operation moves from the edge of the touch screen to the center of the touch screen, and the edge touch operation is not a swipe operation, it is determined that the coordinate point movement track does not satisfy the preset movement condition. And at this time, step 107 is executed. An execution order of the above-described two modes of judging whether the coordinate point movement track of the edge touch operation satisfies the preset movement condition is not specifically limited in this embodiment, and a specific judgment mode of sub-step 1052 is not be specifically limited.

Step 106: it is determined that the edge touch operation is not an edge mis-operation, and the edge touch operation is output.

An outputting mode of the edge touch operation is the same as the outputting mode of the non-edge touch operation in step 103, which will not go into details here.

Step 107: the edge touch operation is determined as an edge mis-operation, and the edge mis-operation is suppressed.

Specifically, when the edge touch operation is detected, the touch coordinates generated by the edge touch operation on the touch screen are acquired in real time. If the current edge touch operation is an edge mis-operation, the touch coordinates of the current edge touch operation are not reported to the system, so that the screen does not respond to the current edge touch operation (i.e., the edge mis-operation). Alternatively, the touch coordinates generated by the edge touch operation on the touch screen may also be acquired when it is determined that the edge touch operation is not an edge mis-operation, so that a calculation step of the touch coordinates of the edge mis-operation may be omitted.

As compared with the existing technology, in this embodiment, by extending time for detecting whether there is a suppression region when the edge touch operation is detected, it is favorable for eliminating judgments of edge mis-operations caused by different postures, and meanwhile, operation mode detection continues to be performed on the edge touch operation that is preliminarily determined as an edge mis-operation, thus it is favorable for screening out the operation desired by the user, to avoid directly suppressing the edge touch operation that only preliminarily satisfies the critical judgment condition.

A second embodiment of the present disclosure relates to a method for preventing an edge from being unintentionally touched, the second embodiment is improved on the basis of the first embodiment, and a main improvement is that: in the second embodiment, the operation mode of the edge touch operation is further detected within the first preset period, so that the operation mode of a user may be detected more flexibly.

Figure 6:
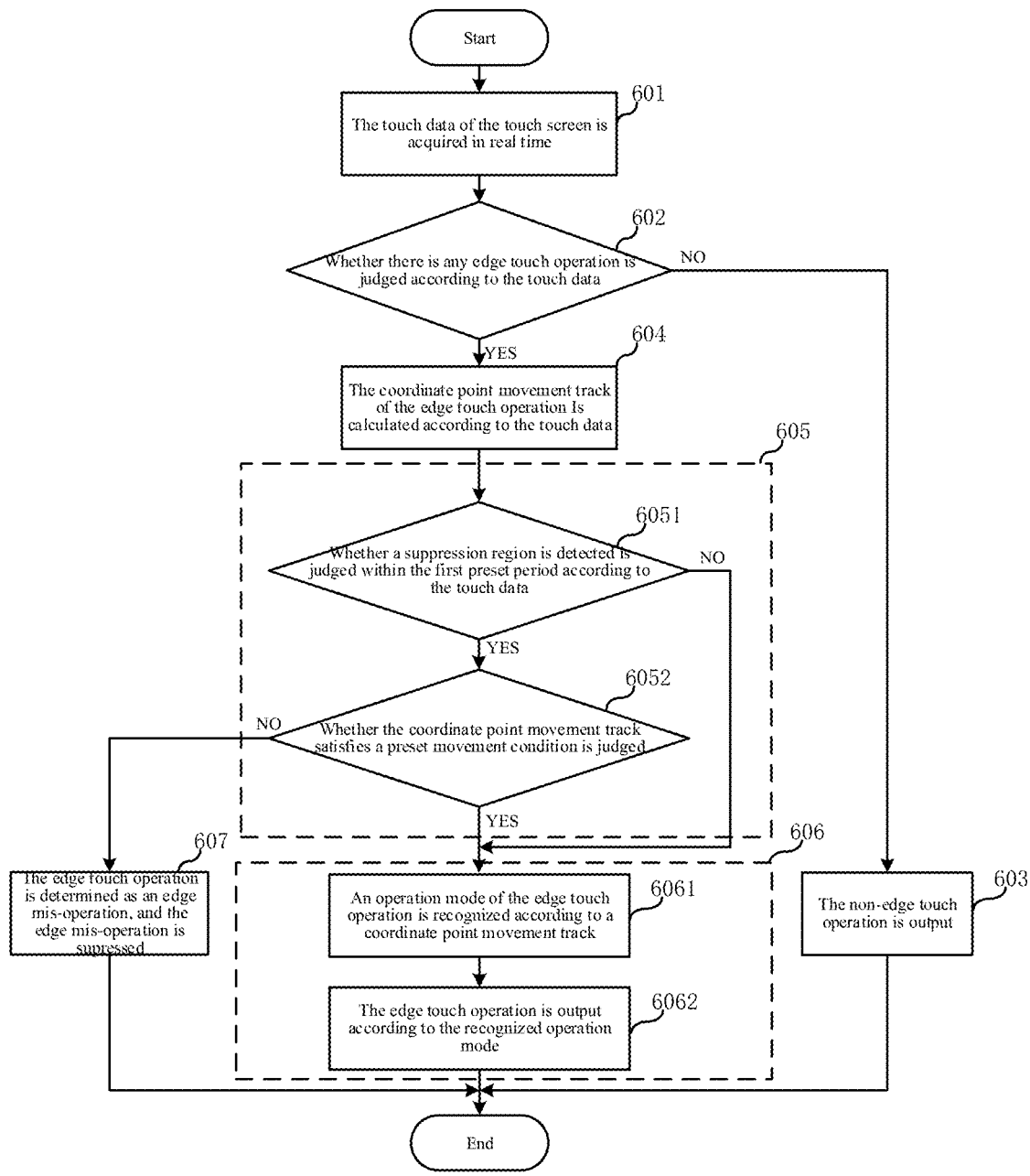
FIG. 6 is a flow chart of a method for preventing an edge from being unintentionally touched according to a second embodiment of the present disclosure.

With reference to FIG. 6, the method for preventing an edge from being unintentionally touched according to this embodiment comprises step 601 to step 607.

Herein, step 601 to step 605 are respectively correspondingly the same as step 101 to step 105 of the first embodiment, and step 607 is correspondingly the same as step 107, which will not go into details here.

Step 606 specifically includes sub-step 6061 and sub-step 6062.

Sub-step 6061: an operation mode of the edge touch operation is recognized according to a coordinate point movement track.

Sub-step 6062: the edge touch operation is output according to the recognized operation mode.

Specifically, in sub-step 6061, it may be judged whether it is detected that a movement distance of the edge touch operation is greater than a preset distance within the first preset period according to the coordinate point movement track; and the operation mode of the edge touch operation is determined as a swipe if it is greater than the preset distance. In sub-step 6062, when the operation mode of the edge touch operation is a swipe, for example, the edge touch operation starts to be output from a starting point of the coordinate point track of the edge touch operation. Herein, the preset distance may be used for distinguishing between different operation modes, for example, distinguishing between a swipe and a click or a long press. A value of the preset distance may be preset according to empirical data, and the preset distance is not specifically limited in this embodiment. In one example, in sub-step 6061, when it is determined that it is not detected that the movement distance of the edge touch operation is greater than the preset distance within the first preset period, the operation mode of the edge touch operation may be further determined as a click or a long press. For example, in a case where a value of the first preset period is relatively large, when it is not detected that the movement distance of the edge touch operation is greater than the preset distance within the first preset period, the operation mode of the edge touch operation may be determined as a long press; in a case where the value of the first preset period is relatively small, when it is not detected that the movement distance of the edge touch operation is greater than the preset distance within the first preset period, the operation mode of the edge touch operation may be determined as a click. The first preset period may be set according to experiences, and is not specifically limited in this embodiment. When the operation mode of the edge touch operation is recognized as a click or a long press in sub-step 6061, the click or the long press is correspondingly output in sub-step 6062.

In one example, as a supplement to an operation mode such as a swipe, a click and a long press, when the edge touch operation is detected and it is determined that the touched region of the edge touch operation is not a suppression region, it may further be detected whether the edge touch operation leaves a touch screen within the first preset period, and the operation mode of the edge touch operation is determined as a quick click if it is detected that the edge touch operation leaves the touch screen within the first preset period.

In one example, the method for preventing an edge from being unintentionally touched may be further supplemented. Specifically, the method for preventing an edge from being unintentionally touched further comprises: judging whether a touch operation occurs in a central region of the touch screen within a third preset period before the edge touch operation is detected. If no touch operation occurs in the central region of the touch screen, the coordinate point movement track of the edge touch operation is calculated according to touch data; and if any touch operation occurs in the central region of the touch screen, the edge touch operation is suppressed. For example, after the user touches the central region of the touch screen with a finger, the edge touch operation is detected within relatively short time (i.e., within the third preset period), and at this time, the edge touch operation is usually caused by the user's palm unintentional touch, so the edge touch operation may be directly suppressed. It should be noted that, the third preset period may be set according to experiences, and a value of the third preset period is not specifically limited in this embodiment.

As compared with the existing technology, in this embodiment, on the basis of preliminarily judging whether the edge touch operation is an edge mis-operation according to the touch data, the edge touch operation is further detected in combination with the operation mode of the user, so that the edge mis-operation may be detected more accurately, and the user's normal operation may be responded in time. Through practical verification, the inventor(s) find that, edge mis-operation recognition is more accurate and stable in this embodiment; a success rate of identifying edge mis-operation caused by a palm unintentional touch surpasses 95%; and particularly with respect to a narrow-frame mobile phone, a success rate of suppressing palm unintentional touch is even higher. Meanwhile, there is no absolute-suppression edge region in this embodiment, and a normal click on each edge of the mobile phone may be responded, so edge swipe and line drawing operations is not affected.

A third embodiment of the present disclosure relates to a touch control apparatus, for example, a smartphone, particularly a narrow-frame smartphone. The electronic apparatus comprises: at least one processor, and a memory communicatively connected with the at least one processor. The memory stores instructions executable by the at least one processor. The instructions are executed by the at least one processor, so that the at least one processor can execute the method for preventing an edge from being unintentionally touched according to the first embodiment or the second embodiment.

As compared with the existing technology, in this embodiment, when an edge touch operation is detected, cases of a finger normal operation and a palm/finger unintentional touch are preliminarily distinguished according to touch data of the edge touch operation. On this basis, an operation mode of the edge touch operation that preliminarily conforms to the case of a palm/finger unintentional touch is further detected according to a coordinate point movement track, so as to judge whether the edge touch operation is an edge mis-operation; and therefore, in this embodiment, accuracy of identifying edge mis-operation can be improved, without affecting normal use of an edge region of a screen.

A fourth embodiment of the present disclosure relates to a storage medium, storing a computer program. The computer program, when executed by a processor, implements the method for preventing an edge from being unintentionally touched according to the first embodiment or the second embodiment.

Those ordinarily skilled in the art may understand that, the above-described respective embodiments are specific embodiments for implementing the present disclosure, and in practical application, various changes can be made in forms and details without departing from the spirit and scope of the present disclosure.

What is claimed is:

1. A method for preventing an edge from being unintentionally touched, comprising:
    acquiring touch data of a touch screen in real time;
    calculating, when an edge touch operation is detected according to the touch data, a coordinate point movement track of the edge touch operation according to the touch data;
    detecting, within a first preset period according to the touch data, a suppression region, wherein the suppression region is used for representing a touched region when a touch data of the touched region meets a critical judgment condition of an edge unintentional touch;
    judging, when the suppression region is detected within the first preset period, whether the coordinate point movement track satisfies a preset movement condition, wherein the preset movement condition is used for reflecting a normal operation mode in the edge touch operation;
    judging, when the coordinate point movement track does not satisfy the preset movement condition, the edge touch operation as an edge mis-operation; and
    suppressing the edge mis-operation;
    wherein detecting, within the first preset period according to the touch data, the suppression region, comprises:
    judging whether the touched region of the edge touch operation is the suppression region when the edge touch operation is detected;
    continuously judging whether the touched region of the edge touch operation is the suppression region before the first preset period is reached, when the touched region is not the suppression region;
    wherein, judging whether the touched region of the edge touch operation is the suppression region, comprises:
    determining the touched region as the suppression region, when a number of touch nodes of each of N edge detection channels of the touched region is greater than a first preset value and the number of touch nodes of each of N edge detection channels sequentially decreases in a direction from an edge of the touch screen to a center of the touch screen;
    wherein N is a natural number greater than or equal to 2.

2. The method according to claim 1, wherein, before judging whether the number of touch nodes of each of N edge detection channels of the touched region is greater than the first preset value, and whether the number of touch nodes of each of the N edge detection channels sequentially decreases in the direction from the edge of the touch screen to the center of the touch screen, the method further comprises:
    judging whether a number of touch nodes included in a single-channel touched region is greater than a second preset value, when the touched region is the single-channel touched region; and
    determining the single-channel touched region as the suppression region, when the number of touch nodes included in the single-channel touched region is greater than the second preset value.

3. The method according to claim 1, wherein, the method further comprises:
    recognizing an operation mode of the edge touch operation according to the coordinate point movement track if no suppression region is detected within the first preset period; and
    outputting the edge touch operation according to the recognized operation mode.

4. The method according to claim 3, wherein, the recognizing the operation mode of the edge touch operation according to the coordinate point movement track, comprises:
    determining, when it is detected that a movement distance of the edge touch operation is greater than a preset distance within the first preset period according to the coordinate point movement track, the operation mode of the edge touch operation as a swipe.

5. The method according to claim 4, wherein, the method further comprises:
    determining, when it is not detected that the movement distance of the edge touch operation is greater than the preset distance within the first preset period, the operation mode of the edge touch operation as a click or a long press.

6. The method according to claim 1, wherein, the method further comprises:
    detecting whether the edge touch operation leaves the touch screen within the first preset period, when it is determined that the touched region of the edge touch operation is not the suppression region; and
    determining the operation mode of the edge touch operation as a quick click, when it is detected that the edge touch operation leaves the touch screen within the first preset period.

7. The method according to claim 1, wherein, the judging whether the coordinate point movement track satisfies the preset movement condition, comprises:
    determining that the coordinate point movement track satisfies the preset movement condition when it is detected that the edge touch operation moves from an edge of the touch screen to a center of the touch screen, or
    determining that the coordinate point movement track satisfies the preset movement condition when it is detected that the edge touch operation is a swipe operation.

8. The method according to claim 7, wherein, the method further comprises:
    determining that the coordinate point movement track does not satisfy the preset movement condition, when it is not detected that the edge touch operation moves from the edge of the touch screen to the center of the touch screen and the edge touch operation is not the swipe operation.

9. The method according to claim 7, wherein, the swipe operation is detected as:
    determining the edge touch operation as the swipe operation, when it is detected that a movement speed of a touch point of the edge touch operation is greater than a preset speed threshold within a second preset period.

10. The method according to claim 1, wherein, the touched region of the edge touch operation is obtained by:
acquiring an initial region of the edge touch operation when the edge touch operation is detected; wherein, difference values of touch nodes within the initial region are all greater than a preset node threshold;
performing search, when the initial region is a single-channel region, on a touch node in a direction from a center of the single-channel region to both ends thereof;
merging, when a touch node out of the initial region is found, the touch node out of the initial region and a node between the initial region and the touch node out of the initial region, into the single-channel region to obtain an enhanced single-channel region; and
taking the enhanced single-channel region as the touched region of the edge touch operation.

11. The method according to claim 1, wherein, the touched region of the edge touch operation is obtained by:
compensating a number of touch nodes of the touched region of the edge touch operation according to a preset compensation mode, when the edge touch operation is located in a corner position of the touch screen;
wherein the preset compensation mode is used for a mode to increase the number of touch nodes of the touched region.

12. The method according to claim 1, wherein, the method further comprises:
determining a touch operation on the touch screen as the edge touch operation when a touched region of the touch operation on the touch screen intersects with a boundary of the touch screen; and
acquiring the touch data of the edge touch operation in real time.

13. The method according to claim 1, wherein, the touched region is obtained by:
extracting a first region from the touch data of the touch operation when the touch operation on the touch screen is detected; wherein capacitive difference values of touch nodes within the first region are all greater than a first node threshold;
performing search within a detection channel adjacent to the first region and close to an edge of the touch screen to determine whether there is a touch node whose capacitive difference value is greater than a second node threshold;
merging, when there is the touch node whose capacitive difference value is greater than the second node threshold, the touch node whose capacitive difference value is greater than the second node threshold into the first region to obtain an enhanced region; and
taking the enhanced region as the touched region of the touch operation on the touch screen;
wherein, the second node threshold is smaller than the first node threshold.

14. The method according to claim 1, wherein, the method further comprises:
judging whether a touch operation occurs in a central region of the touch screen within a third preset period before the edge touch operation is detected;
proceeding to calculate the coordinate point movement track of the edge touch operation according to the touch data if no touch operation occurs in the central region of the touch screen; and
suppressing the edge touch operation if a touch operation occurs in the central region of the touch screen.

15. A touch control apparatus, comprising:
at least one processor; and
a memory communicatively connected with the at least one processor; wherein,
the memory stores instructions executable by the at least one processor, and
the instructions are executed by the at least one processor, so that the at least one processor can execute a method for preventing an edge from being unintentionally touched which comprises:
acquiring touch data of a touch screen in real time;
calculating, when it is detected an edge touch operation according to the touch data, a coordinate point movement track of the edge touch operation according to the touch data;
detecting, within a first preset period according to the touch data, a suppression region, wherein the suppression region is used for representing a touched region when a touch data of the touched region meets a critical judgment condition of an edge unintentional touch;
judging, when the suppression region is detected within the first preset period, whether the coordinate point movement track satisfies a preset movement condition, wherein the preset movement condition is used for reflecting a normal operation mode in the edge touch operation;
judging, when the coordinate point movement track does not satisfy a preset movement condition, the edge touch operation as an edge mis-operation; and
suppressing the edge mis-operation;
wherein detecting, within the first preset period according to the touch data, the suppression region, comprises:
judging whether the touched region of the edge touch operation is the suppression region when the edge touch operation is detected;
continuously judging whether the touched region of the edge touch operation is the suppression region before the first preset period is reached, when the touched region is not the suppression region;
wherein, judging whether the touched region of the edge touch operation is the suppression region, comprises:
determining the touched region as the suppression region, when a number of touch nodes of each of N edge detection channels of the touched region is greater than a first preset value and the number of touch nodes of each of N edge detection channels sequentially decreases in a direction from an edge of the touch screen to a center of the touch screen;
wherein N is a natural number greater than or equal to 2.

16. A non-transitory computer-readable storage medium, storing a computer program, wherein, the computer program, when executed by a processor, implements a method for preventing an edge from being unintentionally touched which comprises:
acquiring touch data of a touch screen in real time;
calculating, when it is detected an edge touch operation according to the touch data, a coordinate point movement track of the edge touch operation according to the touch data;
detecting, within a first preset period according to the touch data, a suppression region, wherein the suppression region is used for representing a touched region when a touch data of the touched region meets a critical judgment condition of an edge unintentional touch;
judging, when the suppression region is detected within the first preset period, whether the coordinate point movement track satisfies a preset movement condition, wherein the preset movement condition is used for reflecting a normal operation mode in the edge touch operation;

judging, when the coordinate point movement track does not satisfy a preset movement condition, the edge touch operation as an edge mis-operation; and suppressing the edge mis-operation;

wherein detecting, within the first preset period according to the touch data, the suppression region, comprises:

judging whether the touched region of the edge touch operation is the suppression region when the edge touch operation is detected;

continuously judging whether the touched region of the edge touch operation is the suppression region before the first preset period is reached, when the touched region is not the suppression region;

wherein, judging whether the touched region of the edge touch operation is the suppression region, comprises:

determining the touched region as the suppression region, when a number of touch nodes of each of N edge detection channels of the touched region is greater than a first preset value and the number of touch nodes of each of N edge detection channels sequentially decreases in a direction from an edge of the touch screen to a center of the touch screen;

wherein N is a natural number greater than or equal to 2.

* * * * *